Aug. 17, 1971  J. P. COFFEY ET AL  3,600,233
BLOW MOLDED BATTERY CONTAINER AND INDIVIDUAL BLOW
MOLDED CELL MODULES HOUSED THEREIN
Filed Sept. 12, 1969  3 Sheets-Sheet 1

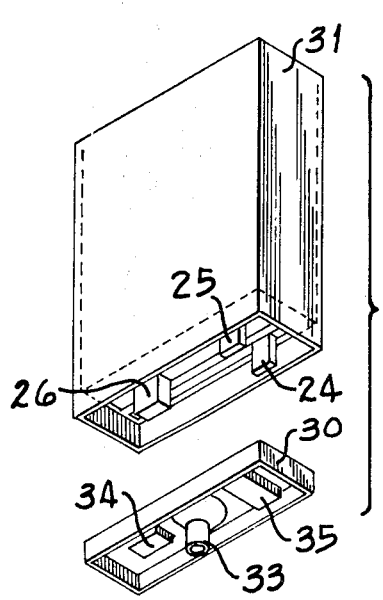
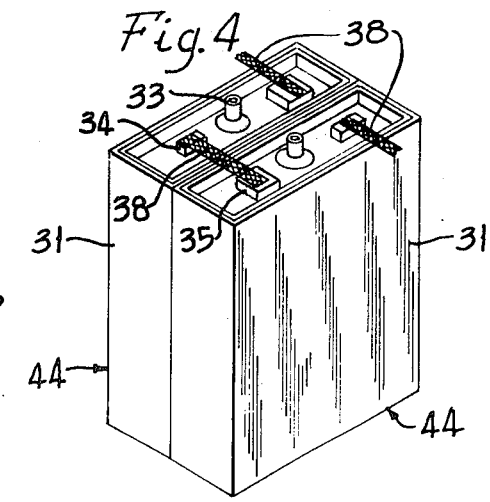
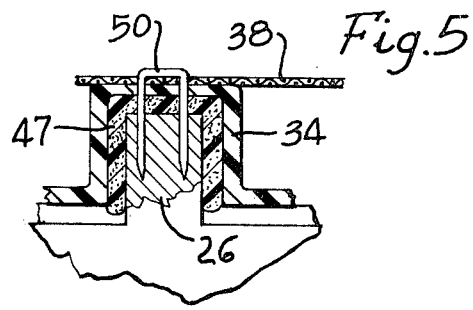
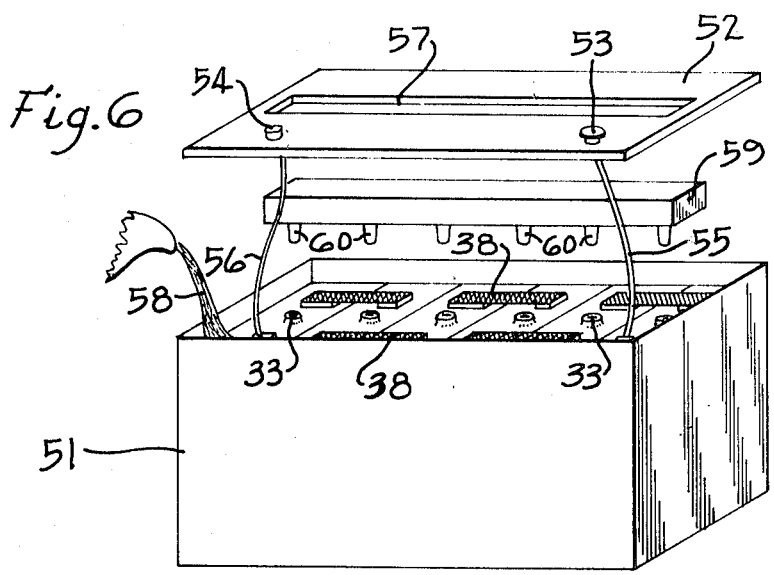

United States Patent Office 3,600,233
Patented Aug. 17, 1971

3,600,233
BLOW MOLDED BATTERY CONTAINER AND INDIVIDUAL BLOW MOLDED CELL MODULES HOUSED THEREIN
James P. Coffey, Hatboro, Pa., James W. Consolloy, Pennington, N.J., and Frank A. Vengrofski, Rockledge, Pa., assignors to ESB Incorporated
Filed Sept. 12, 1969, Ser. No. 857,319
Int. Cl. H01m 35/32
U.S. Cl. 136—134R          8 Claims

ABSTRACT OF THE DISCLOSURE

A battery comprising blow molded battery cell modules is disclosed wherein external intercell connectors are provided for interconnecting the individual modules. The modules are housed in a blow molded battery container which has a manifold venting arrangement.

BACKGROUND OF THE INVENTION

This invention generally relates to lead acid batteries and the construction thereof. It particularly relates to a battery construction utilizing blow molding techniques for making the battery container and individual battery cell modules.

Although blow molding has in the past offered potential cost savings in the manufacture of lead acid battery containers, there has not been much development work in this area for a variety of reasons. Lead acid battery containers usually have partition walls integrally molded therewith to form separate cell compartments in which are placed stacks of electrode plates to form battery cells. The container must be rigidly constructed to withstand the weight of the lead electrodes as well as the constant vibration to which a battery is oftentimes subjected. Also, the electrodes "grow" over a period of time as a result of expansion of active material and this places added pressure against the container walls.

The battery cells in conventional batteries are interconnected in a variety of ways designed to minimize the internal resistance while preventing electrolyte from leaking from one cell to another. The interconnectors normally pass over the partition wall between cells or are of the "through the partition" variety.

Blow molding cannot provide a battery container with integrally molded partition walls and so it is necessary to make other arrangements for isolating each cell from the others to be certain they remain separate cell units. This together with other factors has caused the industry generally to resist using blow molding in making battery containers. However, this invention involves novel approaches in the assembly of lead acid batteries using blow molding techniques to provide a useful blow molded battery container and assembly.

SUMMARY OF THE INVENTION

This invention therefore is aimed at providing a blow molded battery container and individual blow molded cell modules housed therein which can be easily mass produced and ultimately reduce the cost of the battery container.

With the use of this invention, it is an object to provide simpler means for interconnecting the battery cells within the container. Not only does the invention provide a simpler intercell connecting means, but also it substantially eliminates the opportunity for electrolyte to leak from each cell. This is brought about by the fact that the cells are encased in individual modules with the electrode lugs sealed in the module covers and are interconnected by means of external conductors which are brought into contact with the cell electrode lugs by means of fasteners, such as staples, which are driven through the cover of each module. The staples become embedded in the electrode lugs with the result that no electrolyte leakage path is formed. Also, with the intercell connecting means of this invention it is no longer required that the material used as the connector be non-corrosive in the electrolyte since it never comes into contact with the electrolyte.

It is also an object of this invention to provide a unique separator assembly within each battery cell wherein the separator acts as an absorber supporter and separator. A particular advantage afforded by the separator used in this invention is the fact that it absorbs the pressure exerted by the lead electrodes as they "grow" and thereby relieves the stress and pressure on the cell walls caused by the electrodes. Although the separator absorbs the pressure exerted by the expanding electrodes, this does not affect its function as a separator nor are the electrodes affected in an undesirable way. Another object of this invention is to have a unique means of sealing the module container whereby the cells' lugs are sealed in the module cover and do not pass therethrough.

BRIEF DESCRIPTION OF THE DRAWING

FIG. 3 illustrates the technique for sealing the module cover to the module container with the cell electrodes and separator therein;

FIG. 4 is a drawing of two cell modules interconnected in series;

FIG. 5 is a partial view in section of the intercell connecting means of this invention;

FIG. 6 shows a blow molded battery container having six individual cell modules therein with a sub-cover about to be assembled thereto.

DESCRIPTION OF THE PREFERRED EMBODIMENTS

This invention provides a battery construction utilizing blow molding techniques to permit assembly of individual blow molded cell modules in a blow molded container wherein the modules are externally connected in series to provide a battery. The cell electrodes are housed in pockets of a sugar pore microporous polyethylene separator which absorbs the pressure exerted by the electrodes as they grow over a period of time thereby permitting the use of thin walled blow molded modules. The cell electrode lugs are sealed in the module cover and staples are driven through the module cover and embedded in each electrode lug. The staple is connected to a braided metal which is used as the intercell connector. A particular embodiment of this invention is illustrated in the accompanying figures, a detailed discussion of which follows.

Figure 1:
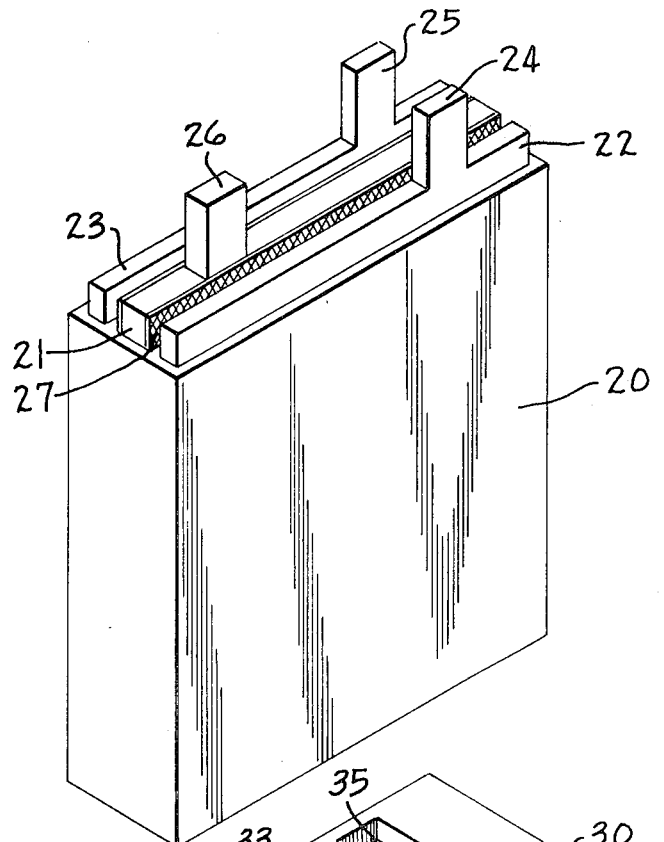
FIG. 1 shows a separator having three pockets with three electrodes partially inserted in the pockets.

In FIG. 1 there is shown a separator 20 having electrodes inserted in pockets provided in the separator. The separator is made of a sugar pore microporous polyethylene mix although other plastic mineral materials such as polyvinyl chloride would be suitable. A detailed description of the method of making this separator material appears in U.S. Pat. No. 3,375,208 entitled "Method for Preparing a Microporous Thermoplastic Resin Material." In accordance with that patent, a thermoplastic resin composition is treated with a leaching solvent to remove one or more pore forming agents. The solid, particulate thermoplastic resin which is insoluble in the leaching solvent is intimately mixed under heat and pressure with a solid, particulate thermoplastic resin which is insoluble in the leaching solvent to soften the resins into plasticized mass. The melt is shaped and then contacted with the leaching solvent to remove substantially all of the soluble thermoplastic resin, thereby rendering the insoluble resin microporous. The thermoplastic resin composition can be loaded with a filler material, and an additional pore forming agent can be incorporated into the resin composition to provide an exceptionally large pore volume upon removal of the pore-forming agents. This separator material is suitable for absorbing the pressure exerted by the lead electrodes as they grow after cycling over a period of time.

FIG. 1 also shows a positive electrode 21 partially inserted in the center pocket while negative electrodes 22 and 23 are shown partially inserted into the other two separator pockets. The electrodes are assembled in parallel with the lugs 24, 25 of the negative electrodes at one end of the unit while the positive electrode lug 26 is positioned at the other end of the separator. A glass mat 27 is wrapped around and covers both surfaces of the positive electrode in order to act as a retainer to keep the positive active material intact as well as to permit gas formed during charging to escape. Prior to assembling the electrodes and separator in the module, the electrodes are fully inserted into their pockets so that only the lugs of the electrodes extend above the separator.

Figure 2:
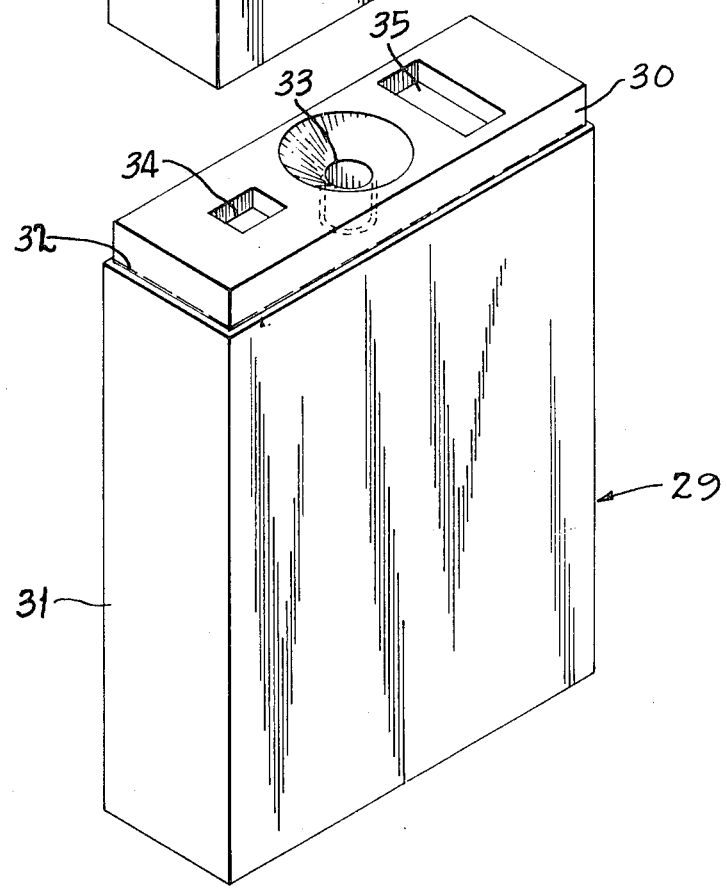
FIG. 2 is a drawing of a blow molded module cell container and cover.

FIG. 2 shows a blow molded cell module 29 wherein the cover 30 and the container 31 are molded as a unit. This unit can be molded of any suitable plastic, such as polyethylene. The cover is removable from the container body along a perforated parting line 32. As shown in the figure, the module cover 30 has a vent and filler hole 33 together with two cavities 34 and 35. The first cavity 34 is designed to receive the lug of a positive electrode. The second cavity 35 which is larger than the first is designed to receive the two negative electrode lugs. The lugs are sealed in these cavities with an adhesive as will be explained subsequently. If additional electrodes are provided in a cell the cavities in the cover can be made larger to accommodate them.

FIG. 3 illustrates a technique for sealing the cover 30 to the module container body 31 while also sealing the electrode lugs 24, 25 and 26 in the cover cavities 35 and 34. The cover has already been removed from the molded container along the parting line 31 shown in FIG. 2 and has been placed with its tubular filling and venting hole 33 pointing downward. This view also shows the underside of the bottoms of cavities 34 and 35. Therefore, the separator with the electrodes in place in the pockets is shown placed in the container 31 but not bottomed therein so as to allow the lugs to extend above the top edge of the container. This assembly is then inverted as shown in the figure and lowered onto the module cover 30 which has a hot melt, not shown, in the cavities 34 and 35. The lugs become embedded in this hot melt which upon cooling solidifies and seals the lugs in the cavities. The sizes of the cavities 34 and 35 are such that the lugs fit tightly therein and therefore are accurately located in place. The depth of the cavities is approximately one half the height of the electrode lugs. After this cooling and sealing takes place, the separator with the electrodes in place is then pushed further down into the module container where it comes into register with supporting edges which preferably are rounded.

The preferred hot melt is commercially available as Shellpax 700 although other suitable materials include asphalts, epoxies, urethanes and other seal fillers. A perimeter heat seal is then made around the edges of the jar so that the cover becomes sealed thereto. The only opening now remaining in the cell module is the vent and filling well 33.

FIG. 4 shows two of the assembled cell modules 44 side by side and connected in series by a connecting strap 38. The other connector straps 38 are shown with free ends so that they may be used either to serve as intercell connectors to other cells or as terminal straps for a two cell battery. Thus the one strap 38 is shown with one end on the flat top surface of cavity 35 in which are sealed the negative electrode lugs of one module and with its other end on the top surface of cavity 34 in which is sealed the positive electrode lug of the other module. The filling and venting wells of the modules are again shown at 33 The connecting straps can be made of any suitable conductive material with flat copper wire screen having been found satisfactory in practice.

FIG. 5 is a partial view in section of an electrode lug sealed in the cavity 34 of the module cover and illustrates the technique used to make contact between the connecting straps and the electrodes in order to interconnect the cells electrically as in FIG. 4. The connecting strap 38 is shown on the top flat surface of the cavity 34. A sealant 47 is shown lining the inner walls of the cavity and acts to seal the electrode lug 26 in the cavity. A metal staple 50 has been driven through the top of the cavity and is shown embedded in the electrode lug 26 thereby electrically connecting the strap 38 to the electrode lug. This process is repeated for each electrode lug sealed in the cavities of the cell modules in order to interconnect the modules as in FIG. 4.

As shown in FIG. 5, the staple 50 passes through the top of cavity 34 and the sealant 47 to become embedded in the electrode lug 26. An advantage of this through-the-cover contact between electrode and intercell connecting strap is the fact that no path exists for electrolyte to leak around the staple out onto the top of the cell. Also, since neither the staple 50 nor the strap 38 come into contact with the cell electrolyte these items do not have to be made of non-corrosive materials but need only be good conductors.

FIG. 6 is a drawing of a blow molded battery container 51 together with the sub-cover 52 therefor. Again, polyethylene or other suitable plastic can be used here. In the container are shown six individual cell modules interconnected by straps 38 as previously described to form a 12 volt battery. In a manner similar to that of the blow molded modules the battery sub-cover and container have been molded as a unit, with the sub-cover being removable from the container along a parting line. In the figure, the sub-cover has already been removed from the container and terminals 53 and 54 have been inserted in holes provided in the sub-cover during molding. The terminals are connected by means of conductive straps 55 and 56 to the electrode lugs of opposite polarity of the end cells of the battery. These straps are connected to the electrode lugs by means of staples in the manner described in FIG. 5.

The sub-cover has a rectangular section 57 cut out in its center to permit a manifold venting arrangement to be incorporated in the battery. The sub-cover is placed on the container by first pouring a hot melt 58 over all the cell modules up to a height above the intercell connectors but below tops of the module filler-vent holes 33. During this time a plastic manifold jig 59 having six tubes 60 is disposed over the filler-vent holes 33 with each tube mated with one of the filler-vent holes to prevent the area around the filler holes from becoming sealed by the hot melt. The jig 59 is shown suspended above the filler holes in the figure, however in practice during pouring of the hot melt 58 the tubes are in contact with their respective cell filler holes. The sub-cover is moved down over the manifold jig and brought into contact with the hot melt and sealed to the battery container. After the melt cools and the jig is removed, the cells are filled with electrolyte.

Figure 7:
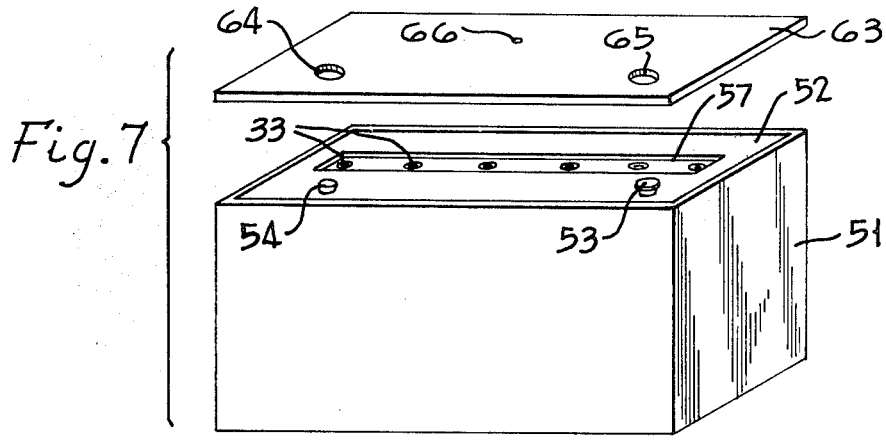
FIG. 7 is a drawing of the final assembly of the battery cover to the battery.

FIG. 7 shows the container with the sub-cover 52 sealed in place and with the filler vent holes 33 exposed in the manifold area 57. The final cover 63 is shown about to be placed on the battery and this cover can be sealed to the container by a perimeter seal, for example by fusing the appropriate surfaces of the container 51 and 63. Holes 64 and 65 are provided in the cover for the terminals 53 and 54 and in this instance the terminals are short enough that they remain recessed in the holes 64 and 65. A pin hole 66 is also provided in the cover to serve as a vent for the manifold venting area 57. This pin hole can be better observed in FIG. 8.

Figure 8:
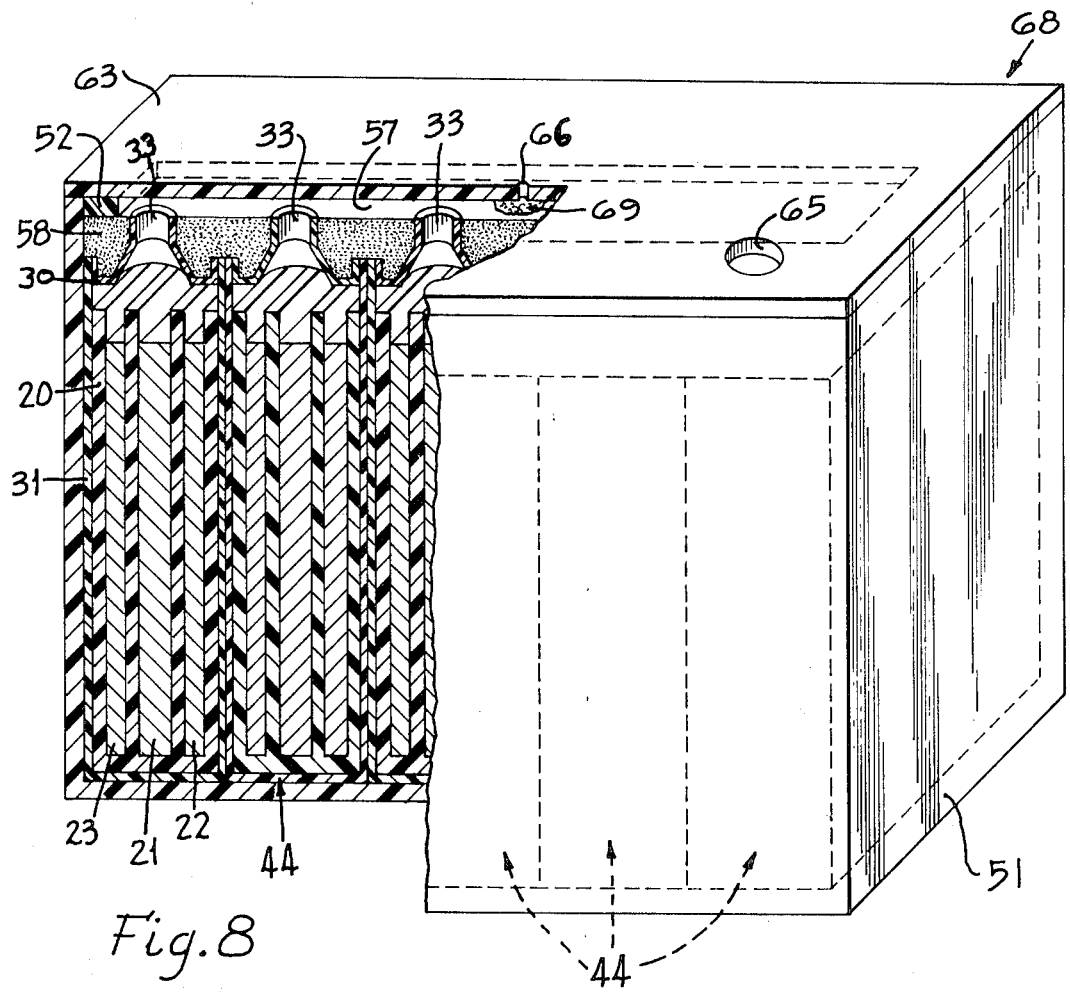
FIG. 8 is a drawing of an assembled battery partially cut away.

In FIG. 8 there is shown a complete battery 68 with one part cut away to disclose the details of the battery interior. The final cover 63 is shown sealed to the blow molded container 51 while the blow molded sub-cover 52 is located beneath the final cover and also is sealed in place. The manifold venting area 57 of the sub-cover is outlined in dotted lines and can be viewed in the portion that has been cut away. A sponge 69 is shown at the bottom of pin hole 66 which communicates with the vent area 57 and serves as the vent hole for the battery. The sponge absorbs any loose electrolyte which may be in the vent area 57 and prevents it from splashing out through the hole 66.

The filler-vent holes 33 of the cell modules are shown opening into the vent area 57. The hot melt 58 is shown solidified and covering the cell modules up to the top of the filler-vent holes. The internal elements of the cell modules are shown and the end module only will be described since the modules are constructed identically. As has been done in the previous figures, common reference numbers are retained throughout the description. Thus the blow-molded end module container is shown at 31 with the separator at 20. The two negative electrodes are shown in pockets of the separator at 22 and 23. The positive electrode 21 is in its separator pocket between the two negative electrodes. The blow molded module cover 30 with the filler-vent hole 33 is sealed to the module container 31. The electrolyte is not shown but normally is absorbed in the pores of the microporous separator 20.

The intercell connectors which interconnect the cells are not shown, but can be seen in FIG. 6. In dashed lines are illustrated the location of the other three cell modules 44 with the first three modules being shown in the cut away portion.

The individual cell modules described above have been shown using two negative electrodes with one positive electrode. The size of the modules and of the whole battery can be varied with the positive electrode preferably being about twice the thickness of an individual negative electrode. Of course, cells having more than three electrodes or having only two electrodes can be made, depending on the requirements which the battery must meet. Cells made according to this invention have been of the lead acid type, although other electrochemical systems are contemplated.

In describing the novel interconnecting means, it was shown that staples can be driven through the cover of each cell module. With sufficiently large staples, it is contemplated that one staple can be used to interconnect the two lugs of the negative electrodes of each cell. Also the conductive strap which interconnects the cells could be substituted using a flat conductive bar which in addition could have sharp edges depending at either end which could be driven through the module covers and thereby replace the staples. Such an intercell connector would resemble a staple with an elongated horizontal bar. The invention also is not limited to the use of staples since alternatives can be envisioned by those skilled in the art.

The invention therefore has been described illustrating a particular embodiment. This is not intended as being limitative of the invention, but rather other modifications apparent to those skilled in the art are clearly included in the scope of the invention.

What we claim is:

1. A battery comprising two electrochemical cells interconnected with each other, each cell comprising a pair of electrodes of opposite polarity, a separator, an electrolyte, and a blow molded module for housing the cell elements, said module comprising a blow molded body and cover therefor, the cover of said module having two cavities molded therein, one cavity having the lug of one of said electrodes sealed therein and the other cavity having sealed therein the lug of the other electrode so that the lugs do not pass through the cover, said cells being interconnected by interconnecting means placed on top of said module covers and brought into contact with said electrode lugs sealed in said cavities by means of conductive members driven through said covers and embedded in said lugs.

2. A battery of claim 1 wherein said interconnecting means comprises a conductor bridging the distance between the two cells and placed on the covers thereof with either end over one cavity of the respective cell, and conductive elements driven through said conductor at either end and passing through said covers to come into electrical contact with said electrode lugs sealed in said cavities.

3. A battery of claim 2 wherein said conductor is a metallic screen and said conductive elements are metal staples which are driven through said screen and said cover to become embedded in said electrode lugs.

4. A battery of claim 1 wherein said separator is in the shape of a compartmented container which fits snugly inside said cell module and wherein said electrodes are held in the compartments of said separator.

5. A battery of claim 1 wherein said cells are lead acid cells with said electrodes being conventional lead electrodes and said electrolyte being sulphuric acid, said separator being made of microporous polyethylene and in the shape of a container having partitioning walls therein to form compartment-like spaces, said electrodes being held in said spaces and separated from each other by said separator, and said electrolyte being absorbed in said micropores.

6. A battery comprising two electrochemical cells interconnected by conductive interconnector means, each cell comprising a pair of electrodes of opposite polarity, a separator, an electrolyte, and a blow molded module for housing said battery elements, said separator being a container-like, compartmented article, said module comprising a blow molded body and cover therefor, said separator being of such size as to fit snugly into said module body and contain said electrodes in said compartments and separate them from each other, said cover having two cavities molded therein and a filler-vent hole, said cover being sealed to said module body so that the lugs of said electrodes are sealed in said cavities and do not pass through said cover, said interconnector means comprising conductive elements driven through said module covers and embedded in said lugs and conductive members placed across the tops of said covers and being in contact with said conductive elements to interconnect said cells thereby, and a separate blow molded battery container and cover for housing said battery.

7. A battery of claim 6 wherein said cells are lead acid cells comprising a pair of conventional lead electrodes, sulphuric acid electrolyte, and said separator is made of microporous polyethylene.

8. A battery of claim 7 wherein said conductive elements driven through said module covers and embedded in said electrode lugs are metal staples and said interconnecting conductive member is a metal screen.

References Cited
UNITED STATES PATENTS

| | | | |
|---|---|---|---|
| 2,025,482 | 10/1933 | Taylor | 136—134 |
| 3,080,445 | 3/1963 | Brown | 136—111 |
| 2,798,895 | 7/1957 | Nowotny | 136—111 |

WINSTON A. DOUGLAS, Primary Examiner

A. SKAPARS, Assistant Examiner

U.S. Cl. X.R.

136—166, 170